US010659531B2

(12) United States Patent
Zheng et al.

(10) Patent No.: US 10,659,531 B2
(45) Date of Patent: May 19, 2020

(54) INITIATOR AWARE DATA MIGRATION

(71) Applicant: International Business Machines Corporation, Armonk, NY (US)

(72) Inventors: Yong Zheng, Beijing (CN); Zheng Cai Yuan, Beijing (CN); Lin Feng Shen, Beijing (CN); Cheng Ding, Beijing (CN); Wei Gong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 15/726,613

(22) Filed: Oct. 6, 2017

(65) Prior Publication Data

US 2019/0109901 A1 Apr. 11, 2019

(51) Int. Cl.
*H04L 29/08* (2006.01)
*H04L 12/26* (2006.01)
*H04L 12/24* (2006.01)

(52) U.S. Cl.
CPC ...... *H04L 67/1095* (2013.01); *H04L 41/0846* (2013.01); *H04L 41/142* (2013.01); *H04L 43/16* (2013.01); *H04L 67/06* (2013.01)

(58) Field of Classification Search
CPC ..... H04L 67/10; H04L 67/1095; H04L 67/06; H04L 41/0846; H04L 41/142; H04L 43/16
USPC .......................................................... 709/224
See application file for complete search history.

(56) References Cited

U.S. PATENT DOCUMENTS

| 6,772,161 | B2 | 8/2004 | Mahalingam et al. |
| 6,775,673 | B2 | 8/2004 | Mahalingam et al. |
| 7,171,469 | B2* | 1/2007 | Ackaouy ........... G06F 16/9574 709/225 |
| 7,769,711 | B2 | 8/2010 | Srinivasan et al. |
| 9,122,535 | B2* | 9/2015 | Soundararajan ...... G06F 9/5066 |
| 2003/0115434 | A1* | 6/2003 | Mahalingam ....... H04L 67/1095 711/165 |
| 2009/0043978 | A1* | 2/2009 | Sawdon ............... G06F 3/0647 711/162 |
| 2009/0150460 | A1 | 6/2009 | McClanahan et al. |
| 2009/0150462 | A1 | 6/2009 | McClanahan et al. |

(Continued)

FOREIGN PATENT DOCUMENTS

| CN | 103793475 A | 5/2014 |
| CN | 104102725 A | 10/2014 |
| WO | 2015194937 A1 | 12/2015 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Ruolei Zong
(74) *Attorney, Agent, or Firm* — Kelli D. Morin

(57) ABSTRACT

Embodiments of the present disclosure relate to IO initiator aware data migration. A set of statistical metrics for a replica of a data block on a first node of a plurality of nodes is obtained. The first set of statistical metrics is associated with read operations on the replica. The read operations are operations initiated by a second node of the plurality of nodes. If it is determined that a first statistical metric in the set of statistical metrics exceeds a predefined threshold, the replica is migrated from the first node to the second node.

17 Claims, 9 Drawing Sheets

(56) References Cited

U.S. PATENT DOCUMENTS

| | | | | |
|---|---|---|---|---|
| 2009/0228532 | A1* | 9/2009 | Anzai | G06F 16/119 |
| 2013/0246564 | A1* | 9/2013 | Lee | H04L 67/2842 |
| | | | | 709/217 |
| 2014/0156777 | A1* | 6/2014 | Subbiah | H04L 67/1097 |
| | | | | 709/213 |
| 2015/0106578 | A1 | 4/2015 | Warfield et al. | |
| 2015/0149709 | A1* | 5/2015 | Du | G06F 3/0649 |
| | | | | 711/103 |
| 2015/0286413 | A1* | 10/2015 | Olson | G06F 16/119 |
| | | | | 711/103 |
| 2018/0150256 | A1* | 5/2018 | Kumar | H04L 41/0816 |

OTHER PUBLICATIONS

Gulati et al., "Modeling Workloads and Devices for IO Load Balancing in Virtualized Environments," ACM SIGMETRICS Performance Education Review, vol. 37, Issue 3, Dec. 2009, pp. 61-66, https://pdfs.semanticscholar.org/bd24/f5a45a9c91b1274d607a1476b753d885bd50.pdf.

Lu et al., "Aqueduct: online data migration with performance guarantees," https://cseweb.ucsd.edu/classes/fa05/cse226/public_html/READINGS/FAST2002-aqueduct.pdf, Conference on File and Storage Technologies (FAST'02), pp. 219-230, Jan. 28-30, 2002.

* cited by examiner

700

| FileBlockID | ReplicaID | Resident Node | Bytes | IO Initiator | | |
|---|---|---|---|---|---|---|
| | | | | NODE_1 | NODE_2 | ... |
| F1-B1 | F1-B1-R1 | NODE_1 | 1 MB | | | |
| | F1-B1-R2 | NODE_2 | 1 MB | | | |
| | F1-B1-R3 | NODE_4 | 1 MB | | | |
| F1-B2 | F1-B2-R1 | NODE_1 | 32 KB | | 710<br>Count: 20<br>Average time: 13ms | |
| | F1-B2-R2 | NODE_3 | 32 KB | | | |
| | F1-B2-R3 | NODE_4 | 32 KB | | | |

| FileBlockID | ReplicaID | Resident Node | Bytes | IO Initiator | | |
|---|---|---|---|---|---|---|
| | | | | NODE_1 | NODE_2 | ... |
| F1-B1 | F1-B1-R1 | NODE_1 | 1 MB | | | |
| | F1-B1-R2 | NODE_2 | 1 MB | | | |
| | F1-B1-R3 | NODE_4 | 1 MB | | | |
| F1-B2 | F1-B2-R1 | NODE_2 | 32 KB | | 810<br>Count: 0<br>Average time: 0 | |
| | F1-B2-R2 | NODE_3 | 32 KB | | | |
| | F1-B2-R3 | NODE_4 | 32 KB | | | |

Figure 9:
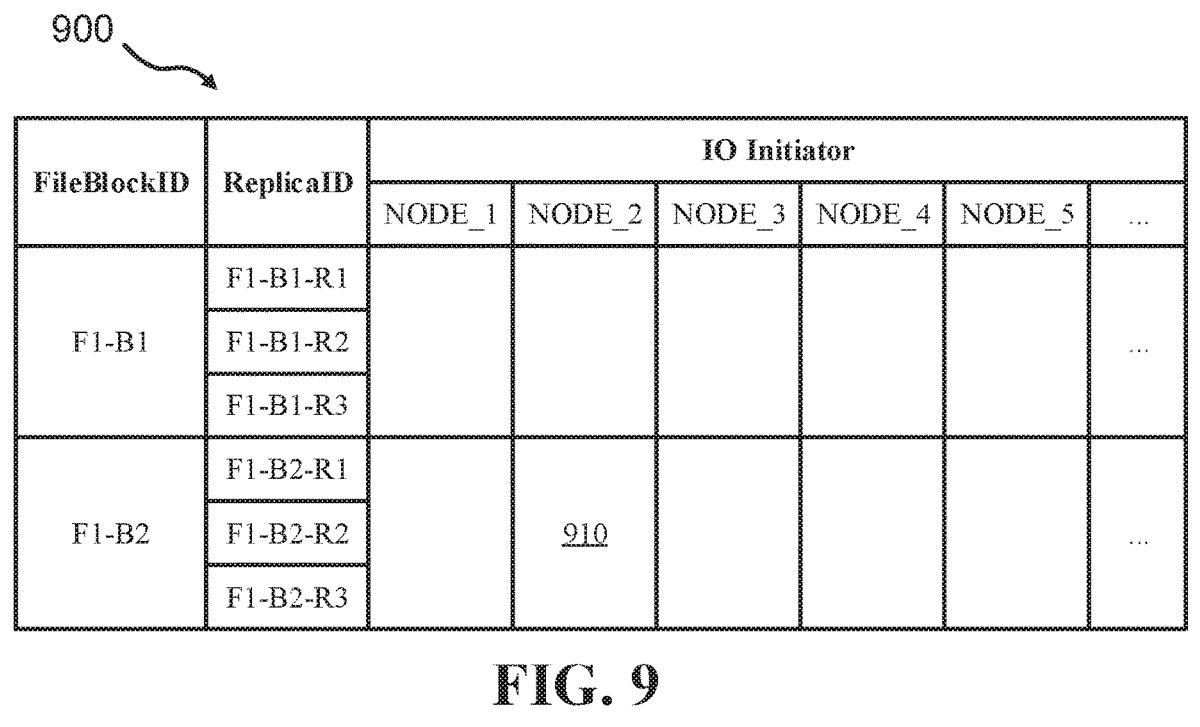

| FileBlockID | ReplicaID | IO Initiator | | | | | |
|---|---|---|---|---|---|---|---|
| | | NODE_1 | NODE_2 | NODE_3 | NODE_4 | NODE_5 | ... |
| F1-B1 | F1-B1-R1 | | | | | | ... |
| | F1-B1-R2 | | | | | | |
| | F1-B1-R3 | | | | | | |
| F1-B2 | F1-B2-R1 | | | | | | ... |
| | F1-B2-R2 | | 910 | | | | |
| | F1-B2-R3 | | | | | | |

| NodeName | Rack |
|---|---|
| NODE_1 | RACK_1 |
| NODE_2 | RACK_1 |
| NODE_3 | RACK_2 |
| ... | ... |

| Rack | NodeList |
|---|---|
| RACK_1 | NODE_1, NODE_2 |
| RACK_2 | NODE_3, NODE_4, NODE_5 |
| RACK_3 | NODE_6, NODE_7, NODE_8 |
| ... | ... |

FIG. 11

INITIATOR AWARE DATA MIGRATION

BACKGROUND

The present disclosure relates to distributed computing environments, and more specifically, to data migration in a distributed computing environment.

A Distributed File System (DFS) is a file system that allows access to files from multiple hosts via a network. A DFS makes it possible for multiple users to share the files and data from multiple machines. DFSs are often used in big data analytics, which handle the exponential growth and availability of data. Data locality aware scheduling has been widely used in big data analytics to facilitate optimal utilization of cluster resources. However, in some situations, the data locality aware scheduling may be very limited or cannot be carried out.

SUMMARY

Example embodiments of the present disclosure include a method, a system, and a computer program product for IO initiator aware data migration. The method comprises obtaining a first set of statistical metrics for a replica of a data block on a first node of a plurality of nodes in a distributed computing environment. The first set of statistical metrics is associated with read operations on the replica. The read operations are initiated by a second node of the plurality of nodes. The method further comprises determining whether a first statistical metric of the set of statistical metrics exceeds a predefined threshold. If the first statistical metric exceeds the predefined threshold, the method includes migrating the replica from the first node to the second node.

It is to be understood that the above Summary is not intended to describe each illustrated embodiments or every implementation of the present disclosure, nor is it intended to be used to limit the scope of the present disclosure. Other features of the present disclosure will become easily comprehensible through the description below.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 7 illustrates a table of statistical metrics of multiple blocks, in accordance with embodiments of the present disclosure.

FIG. 8 illustrates another table of statistical metrics of multiple blocks, in accordance with embodiments of the present disclosure.

FIG. 9 illustrates another table of statistical metrics of multiple blocks, in accordance with embodiments of the present disclosure.

FIG. 10 illustrates a table of rack-node relations, in accordance with embodiments of the present disclosure.

FIG. 11 illustrates another table of rack-node relations, in accordance with embodiments of the present disclosure.

Figure 1:
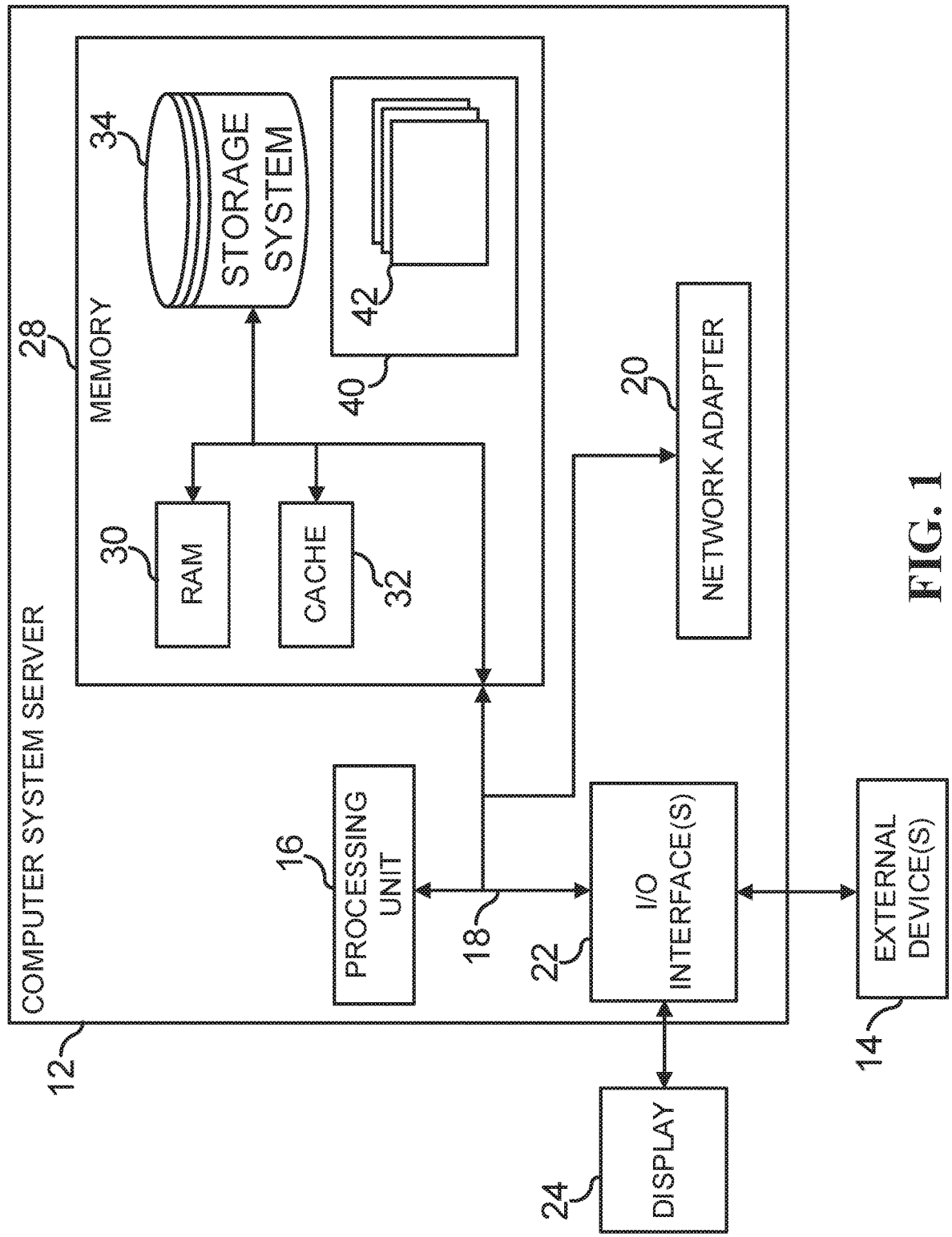
FIG. 1 illustrates a cloud computing node according to an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention. Throughout the drawings, the same or similar reference numerals represent the same or similar elements.

DETAILED DESCRIPTION

Some illustrative embodiments of the present disclosure will be described in more detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which can also be adapted to depict an illustrative example of a portable electronic device such as a communication device being applicable to implement the embodiments of the present invention, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
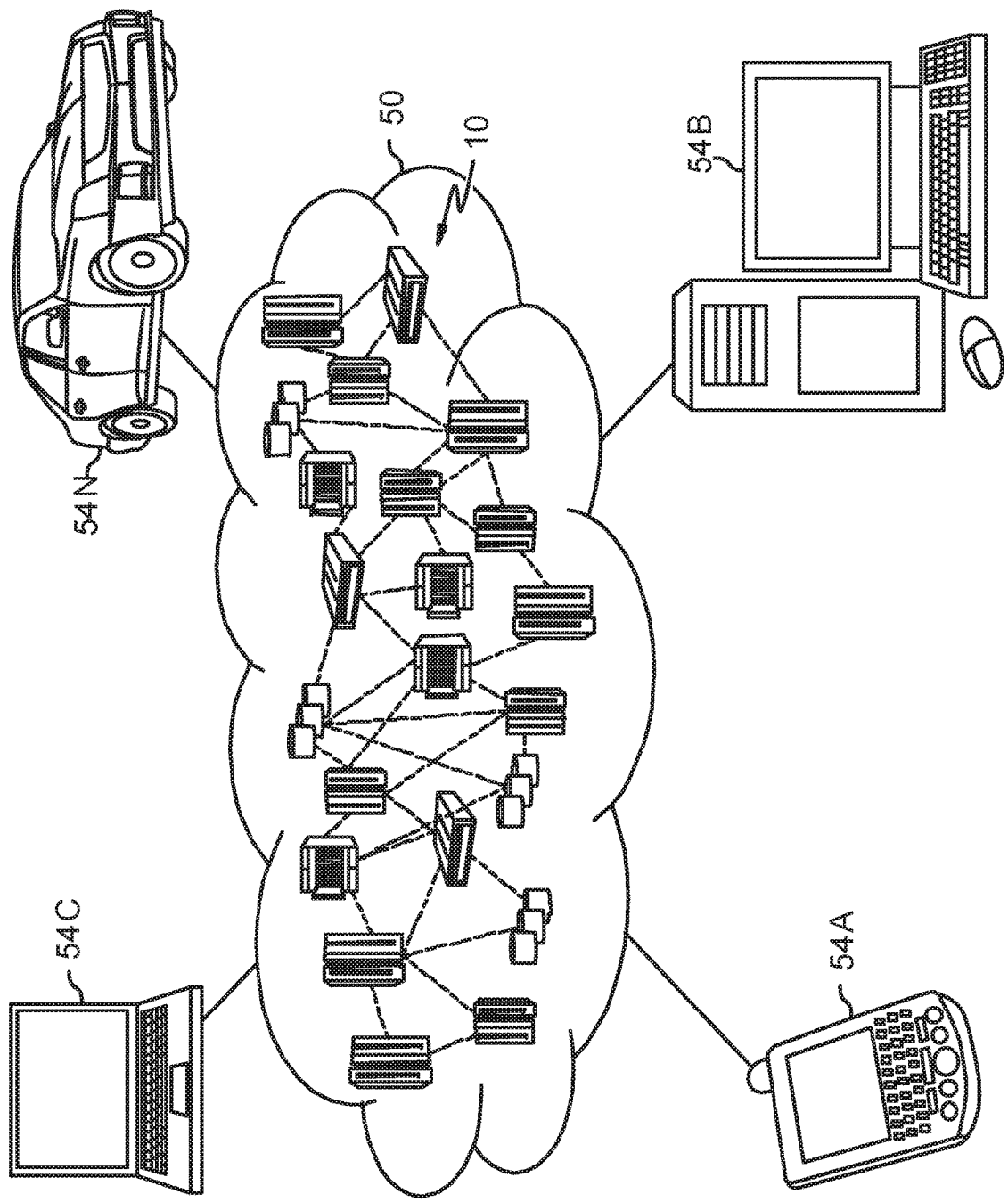
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
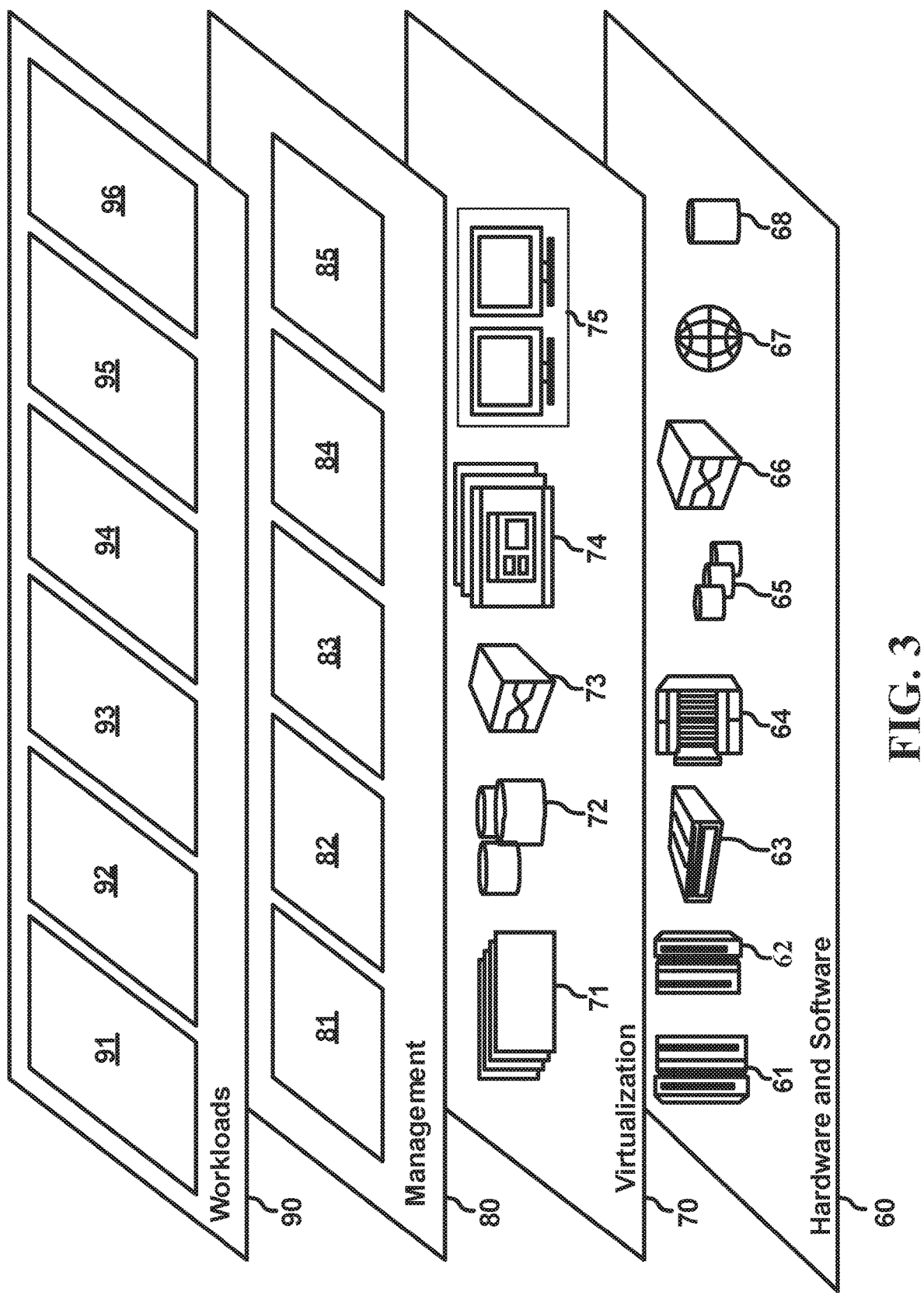
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other functions (e.g., mobile desktop) 96.

Figure 4:
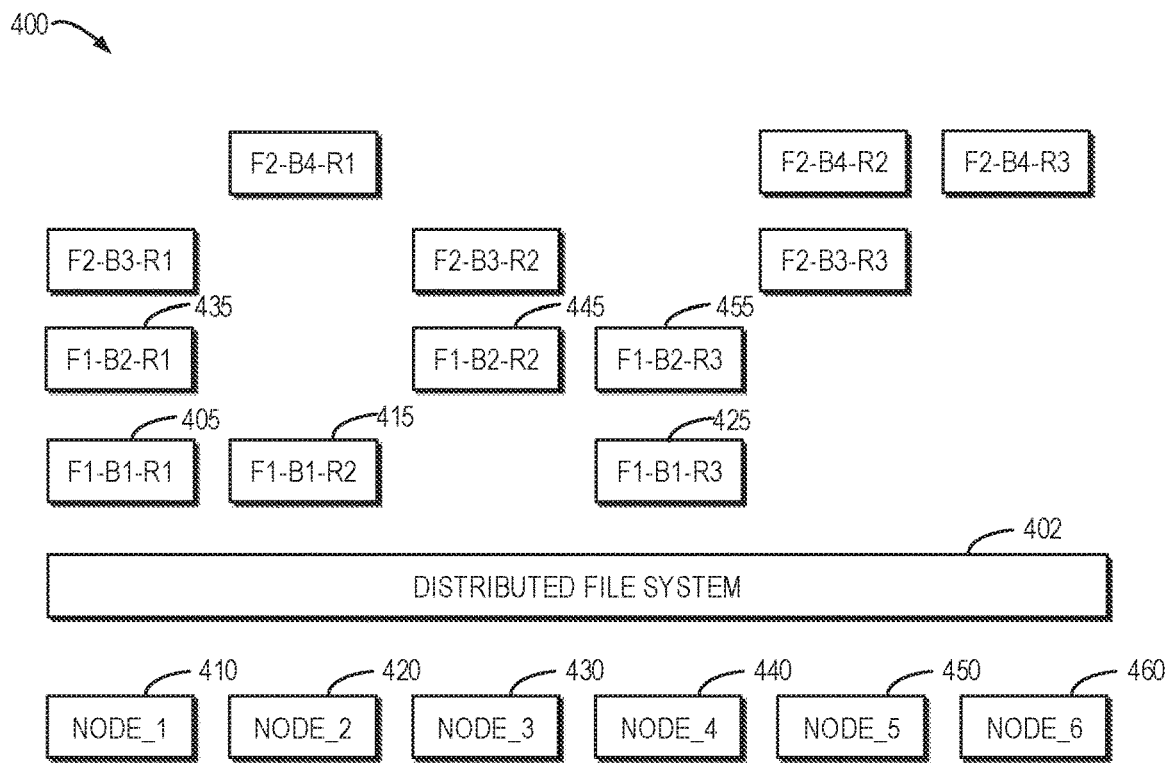
FIG. 4 illustrates an environment in which embodiments of the present disclosure may be implemented.

FIG. 4 illustrates an environment 400 in which embodiments of the present disclosure may be implemented. The environment 400 may be a distributed computing environment, in which multiple networked computers (e.g., nodes) may communicate with each other and coordinate actions using messages. It is to be understood that the environment 400 is described only for the purpose of illustration without suggesting any limitations as to the scope of the present disclosure. The present disclosure can be embodied within any other suitable environments.

As shown in FIG. 4, a distributed file system 402 may be deployed on a cluster of nodes including nodes 410-460. For the sake of simplicity, the nodes 410-460 are also referred to as NODE_1-NODE_6. Each of the nodes 410-460 may be at least in part implemented by a computer system/server 12 as shown in FIG. 1.

In the distributed file system 402, a file may be divided into many blocks by a predefined block size and thus may be stored over the cluster of nodes. For example, each block may have a size of 128 MB. For the distributed file system 402, a data block may be replicated a few times over the cluster of nodes. For example, a data block may be replicated two or three times. In the embodiment as shown in FIG. 4, each data block is replicated three times. It is to be understood that the number of a replica may be variable and, although there are shown three replicas for each data block in FIG. 4, the number of replicas of a particular data block may be different from that of another data block.

In the distributed file system 402, the data resides on the cluster of nodes, and this storage approach may be referred to as "data locality." As shown in FIG. 4, three replicas of a first block (B1) of a first file (F1), denoted as F1-B1-R1 405, F1-B1-R2 415, and F1-B1-R3 425, are located on the nodes 410, 420, and 440, respectively. Similarly, three replicas of a second block (B2) of the first file (F1), denoted as F1-B2-R1 435, F1-B2-R2 445, and F1-B2-R3 455, are located on the nodes 410, 430, and 440, respectively.

A computer program running on the cluster of nodes may also be referred to an "application" or a "job." As an example, in a MapReduce paradigm, the job may include several tasks, which may be either map or reduce tasks. Data locality aware scheduling requires the task to be scheduled to the node where the input data for the tasks are located. For example, if one task will process data of the first block of the first file F1-B1, the task will be scheduled to the nodes 410, 420, or 440, as shown in FIG. 4, because there is a replica of the data block F1-B1 on each of the three nodes. Thus, this approach is also called "data locality aware scheduling."

Data locality aware scheduling may reduce the network traffic and thus improve the job execution performance. However, it is not always possible for the job scheduling to be carried out. For example, if the target node (e.g., a node that stores a replica of a data block to be processed) has been overloaded or all of the target nodes' resources have been allocated by other jobs, the scheduler may ignore the data locality aware scheduling and assign a task to a node where the input data for the task does not exist. As a result, the performance may be degraded due to read operations across different nodes.

Figure 5:
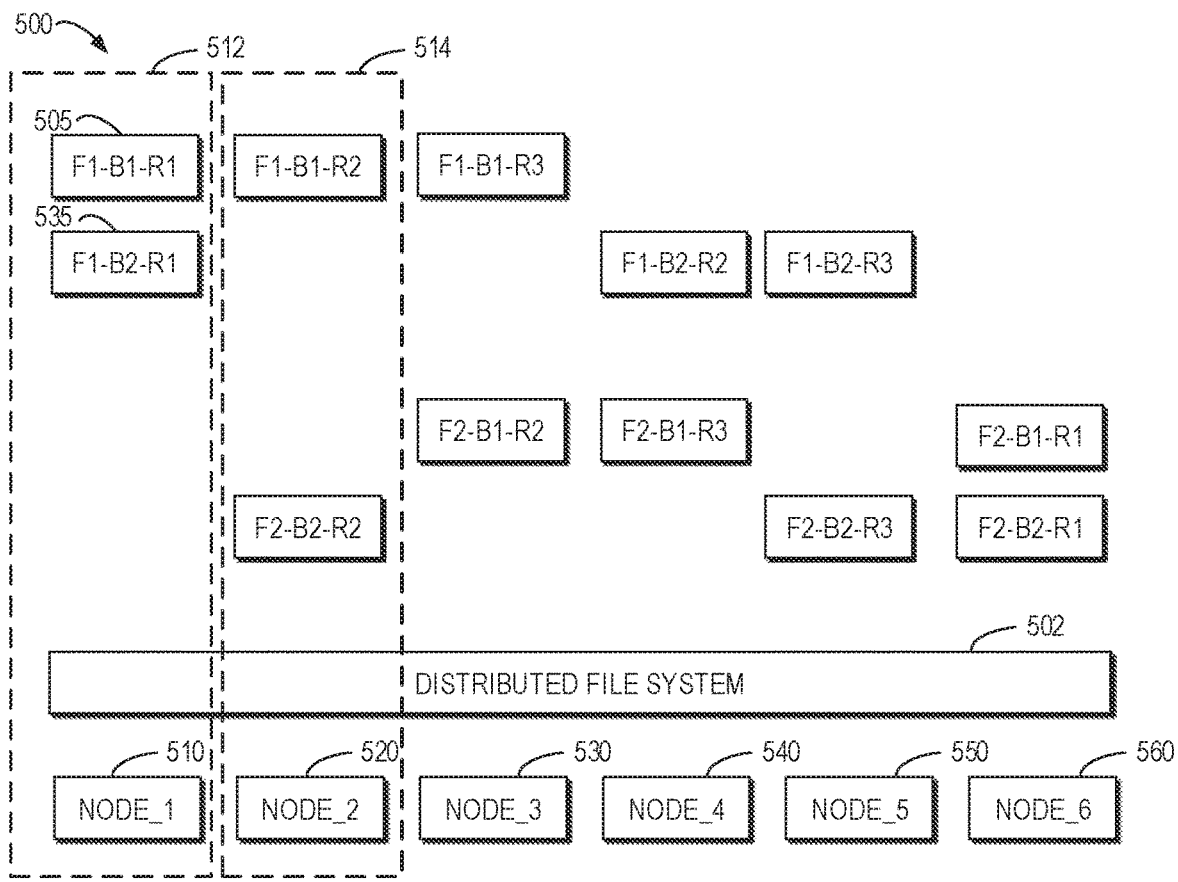
FIG. 5 illustrates a failover phenomenon across region servers of a database, in accordance with embodiments of the present disclosure.

FIG. 5 is a diagram 500 illustrating a failover phenomenon across region servers of a database, in accordance with embodiments of the present disclosure. Failover phenomenon is a frequent event in large commodity hardware cluster. If a node is unable to provide service due to a fault or the like, failover enables a task that the node is running to be automatically switched to another node.

As shown in FIG. 5, a distributed file system 502 may be deployed on a cluster of nodes including nodes 510-560. For the sake of simplicity, the nodes 510-560 are also referred to as NODE_1-NODE_6. Each of the nodes 510-560 may be at least in part implemented by a computer system/server 12 as shown in FIG. 1.

By way of example, the Hadoop DataNode stores the data that the region server is managing. HBase Tables are divided horizontally by row key ranges into "regions." A region contains all rows in the table between the region's start key and end key. Regions are assigned to the nodes in the cluster, called "region servers," and these serve data for reads and writes. As an example, a region server can serve about 1,000 regions.

As shown in FIG. 5, due to the data locality, if the first region 512 of the database (for example, HBase) is served by the node 510, an excellent performance may be achieved because all the data of the first region 512 can be read from local disks. Additionally, a second region 514 exists on NODE_2 520, which allows the second region 514 to be read from local disks (e.g., disks on or directly connected to NODE_2). If the node 510 fails, the service of the first region 512, which includes the first 505 and second 535 blocks of file 1 (i.e., F1-B1 and F1-B2), may be failed over to other nodes, for example, the node 520. However, at least a part of the data of the region 512 may not located in local disks of the failover (e.g., new) node. For example, no replica for the block F1-B2 corresponding to the replica F1-B2-R1 535 is located on the second node 520. All operations after failover will have to be done by reading data from remote nodes over network. For example, in order to perform I/O operations for the second block of file 1 (i.e., F1-B2), data will have to be read from one of NODE_4 540 or NODE_5 550 instead of from local disks (e.g., on NODE_2 520). This will degrade the IO performance rapidly.

In order to solve at least a part of the above and possibly other problems, embodiments of the present disclosure propose a solution of automatically migrating data based on read initiator awareness in distributed file systems to improve the data IO efficiency and thus fast job execution in big data analytics.

It is to be understood that the advantages described herein are example advantages and should not be construed as limiting. Embodiments of the present disclosure can contain all, some, or none of the described advantages while remaining within the spirit and scope of the present disclosure.

Figure 6:
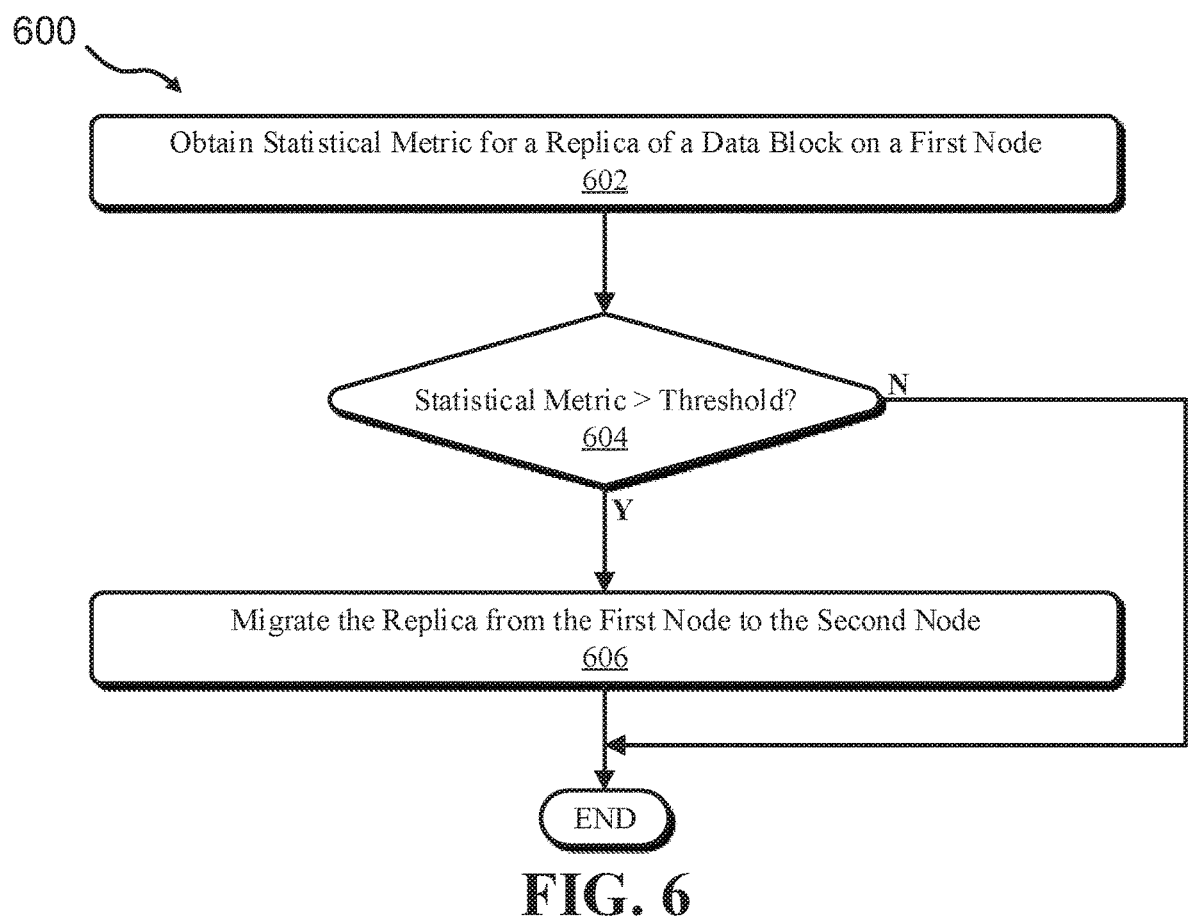
FIG. 6 illustrates a flowchart of a method of migrating data, in accordance with embodiments of the present disclosure.

FIG. 6 illustrates a flowchart of a method 600 of migrating data, in accordance with embodiments of the present disclosure. The method 600 may be implemented by computer programs, such as a daemon, executed by a processor. For example, the daemon may be implemented in a centralized or distributed structure. In the case of the centralized implementation, only one node is deployed to maintain the metadata for the read operations. For example, the daemon may be implemented on a file system manager, which may also manage the distributed file system. In the case of the distributed implementation, each node (or a subset of the nodes) may have a manager that at least in part performs the method 600.

Principles of the present disclosure will now be described with reference to a daemon that implements the method 600. It is to be understood that the daemon is described only for the purpose of illustration without suggesting any limitations as to the scope of the disclosure. As would be recognized by a person of ordinary skill, the method 600 may be embodied entirely in hardware, in a combination of hardware and software, or entirely as software, and the software may be executed as a background process (e.g., a daemon), as an application under direct control of a user, or a combination thereof.

At operation 602, the daemon may obtain a statistical metric for a replica of a data block on a first node of a plurality of nodes. For example, the first node may be NODE_1 410 as shown in FIG. 4 and the replica of the data block may be replica F1-B2-R1 435. The statistical metric may be associated with read operations initiated by a second node of the plurality of nodes. For example, the second node may be NODE_2 420 as shown in FIG. 4.

The statistical data may be included in metadata, which may be maintained in a table for each file, for example. FIG. 7 illustrates a table 700 for maintaining the metadata for the file F1. As shown in the table 700, the file F1 includes a first block F1-B1 and a second block F1-B2, each including three replicas R1, R2, and R3. For example, the data block F1-B1 includes replicas F1-B1-R1, F1-B1-R2, and F1-B1-R3 located on NODE_1, NODE_2, and NODE_4, respectively.

As shown in FIG. 7, each node in the cluster may have a column representing read operations on the file initiated by the node. For each IO initiator node, read count and/or average read time for the node may be recorded. For example, as shown in the entry 710, the replica F1-B2-R1 resides on NODE_1, and the count for the read operations on the replica F1-B2-R1 initiated by NODE_2 420 is 20 and the average read time is 13 ms (millisecond). It is to be understood that it is possible to record only one of the count and the average time, although both of them are shown in FIG. 7 as the statistical metric. For the sake of clarity, other entries for the statistical metric are omitted in the table.

FIG. 7 also shows Bytes of block size of read operations, for example, 1 MB and 32K. It is to be understood that this information is optional and thus may be omitted.

At decision block 604, the daemon may determine whether the statistical metric exceeds a predefined threshold. As described above, the statistical metric may include a count for the read operations, for example. In that case, the daemon may determine whether a count for the read operations initiated by the second node exceeds the predefined threshold. The threshold may be, for example, a count value or a percentage of the read operations from all the nodes. For example, the daemon may determine whether NODE_2 420 initiates more than 80% of the read operations on the replica F1-B2-R1. If so, NODE_2 420 is substantially reading the replica from NODE_1 410, which might significantly deteriorate the performance of the system.

In some embodiments, the statistical metric includes an average time for the read operations. In that case, the daemon may determine whether an average time for the read operations initiated by the second node exceeds the predefined threshold. For example, the daemon may determine whether the average time for the read operations initiated by NODE_2 is greater than a predefined time threshold, for example 10 ms. If so, the read operations initiated by NODE_2 are very sluggish and thus degrade the system performance.

In some embodiments, the time threshold may be based on the other nodes. For example, the time threshold may be the average time to read the replica across all nodes. If nodes 3, 4, 5, and 6 have an average time of 18 ms to read F1-B2-R1, the 13 ms average time for NODE_2 may be considered quick, and thus not a substantial cause of poor system performance.

In some embodiments, the daemon may determine whether the total read time for the read operations exceeds a predefined threshold. For example, the total read time may be determined by multiplying the read count with the average time of the read operations. As shown in FIG. 7, the total read time for the replica F1-B2-R1 initiated by NODE_2 is the count 20 multiplied by the average time 13 ms, which is 260 ms. The total read time may be more effective, since it combines the read frequency and speed of read operations.

It is to be understood that the count, average time per read, and total read time are example statistical metrics, and other statistical metrics may be used. Additionally, any combination of thresholds may be used. For example, in some embodiments, the read rate (e.g., number of reads over a given amount of time), read acceleration (change in the read rate), and change in the average time over a predetermined period may be considered. For example, if the processor determines that the average time per read request has increased from 10 ms to 13 ms over a period of 1 second, the processor may determine the change in average read time to be 3 ms per second. The processor may compare this change in average read time to a threshold, and determined that it exceeds the threshold. Accordingly, even though the 13 ms average time may not exceed its threshold, the processor may initial a migration of the block because the rate of change may be too high. This may be particularly advantageous in that the processor may be able to migrate a data block that is taking longer to be read before the read requests have a negative impact on overall performance (e.g., before the average time exceeds its associated threshold).

If it is determined that the statistical metric exceeds the predefined threshold (Y at 604), the method 600 will proceed to operation 606. At 606, the daemon may migrate the replica from the first node to the second node. For example, if it is determined that the statistical metric for the replica F1-B2-R1 exceeds the predefined threshold, the daemon may migrate the replica from NODE_1 to NODE_2.

Subsequently, the daemon may update the metadata to indicate the migration of the replica. For example, if the replica F1-B2-R1 has been migrated from NODE_1 to NODE_2, the metadata may be updated to indicate that the replica F1-B2-R1 resides on NODE_2 instead of NODE_1. The count and/or average time maintained for the replica F1-B2-R1 may be reset accordingly. Table 800 in FIG. 8 illustrates the updated metadata after migration of F1-B2-R1 to NODE_2 and THE subsequent reset of the statistical information. As shown in table 800, the entry 810 indicates that the count for the read operations on the replica F1-B2-R1 initiated by NODE_2 420 has been reset to be 0 and the average read time has been reset to be 0s.

In some embodiments, the method 600 may be applied to a file-level migration instead of, or in addition to, the block-level migration described above. As described above, a file may be divided into one or more blocks. Therefore, the daemon may obtain statistical metrics for replicas of other data blocks of the file and consolidate them. The statistical metrics may also be associated with the read operations initiated by the second node. For example, the table 700 shown in FIG. 7 for a file may be consolidated to form the table 900 shown in FIG. 9.

At the file level, it is possible to migrate any of the replicas for each block. Thus, the statistical metric for all the replicas of a block may be summed together, for example. As shown in FIG. 9, the total count of read operations on the block F1-B2 initiated by NODE_2 may be computed by summing the counts for the replicas F1-B2-R1, F1-B2-R2, and F1-B2-R3. For example, the entry 910 may record the count or average read time for all the replicas of the block F1-B2 initiated by NODE_2. Then, the statistical metric in a file-level may be computed by summing the counts for all the blocks. Similar processes apply to average time or total time based processing.

In some embodiments, in response to determining that the statistical metrics for the replicas of the other blocks exceed another predefined threshold, the replicas for the other blocks may be migrated to the second node. In the file-level migration, all the blocks of one file may be migrated into the second node. It is to be understood that replica(s) for the file refers to a replica for a block included in the file. For example, if the count for the read operations on a file initiated by NODE_2 is greater than the predefined threshold, any replica for each block of the file may be migrated to NODE_2. Accordingly, only a single replica for each block that makes up the file may be migrated to NODE_2, leaving NODE_2 with one copy of each block for the file. Then, the metadata may be updated to indicate the migration of the replicas.

In some embodiments, communications between different racks may be considered. For example, if the first node is located at a first rack and the second node is located at a second different rack, the replica may be determined to be migrated to the second node by the method 600. However, the second node may not be capable of storing the replica. For example, the second node may include one or more processors (e.g., processors 16 shown in FIG. 1) without a storage system (e.g., storage system 34). If it is determined that the migration from the first node to the second node fails, the replica may be migrated from the first node to a third node that is located at the second rack. In this case, the task running on the second node may read the replica from the third node instead of the first node. In general, the network communication between racks is much slower than the communication between nodes within the same rack. Accordingly, it is possible to improve the task running in the second node by migrating the replica from the first node to the third node. After the migration, the statistical metric(s) may be updated to indicate the migration of the replica.

FIGS. 10 and 11 illustrate two example ways for associating racks with nodes. The daemon may determine the rack holding the nodes based on tables 1000 and 1100, as shown in FIGS. 10 and 11. As shown in FIG. 10, NODE_1 and NODE_2 are located on RACK 1, NODE_3 is located on RACK 2, and so on. As shown in FIG. 11, RACK 1 holds NODE_1 and NODE_2, RACK 2 holds NODE_3-NODE_5, RACK 3 holds NODE_6-NODE_8, and so on.

In accordance with embodiments of the present disclosure, the blocks may be automatically migrated to the node where the data are read frequently. This helps improve the IO read efficiency, since all the data can be read from local disks.

In order to maintain the metadata, the statistical metrics may be updated in response to read operations on the replica initiated by the plurality of nodes. In particular, with respect to the entry 710 in FIG. 7, the statistical metric may be updated in response to a read operation on the replica F1-B2-R1 initiated by the second node NODE_2. In some embodiments, in response to receiving a read request for a file including the data block, a file identifier of the file and a block identifier of the data block may be determined. Then, the file identifier and the block identifier may be associated with the read operations on the replica initiated by the plurality of nodes.

Figures 12, 13:
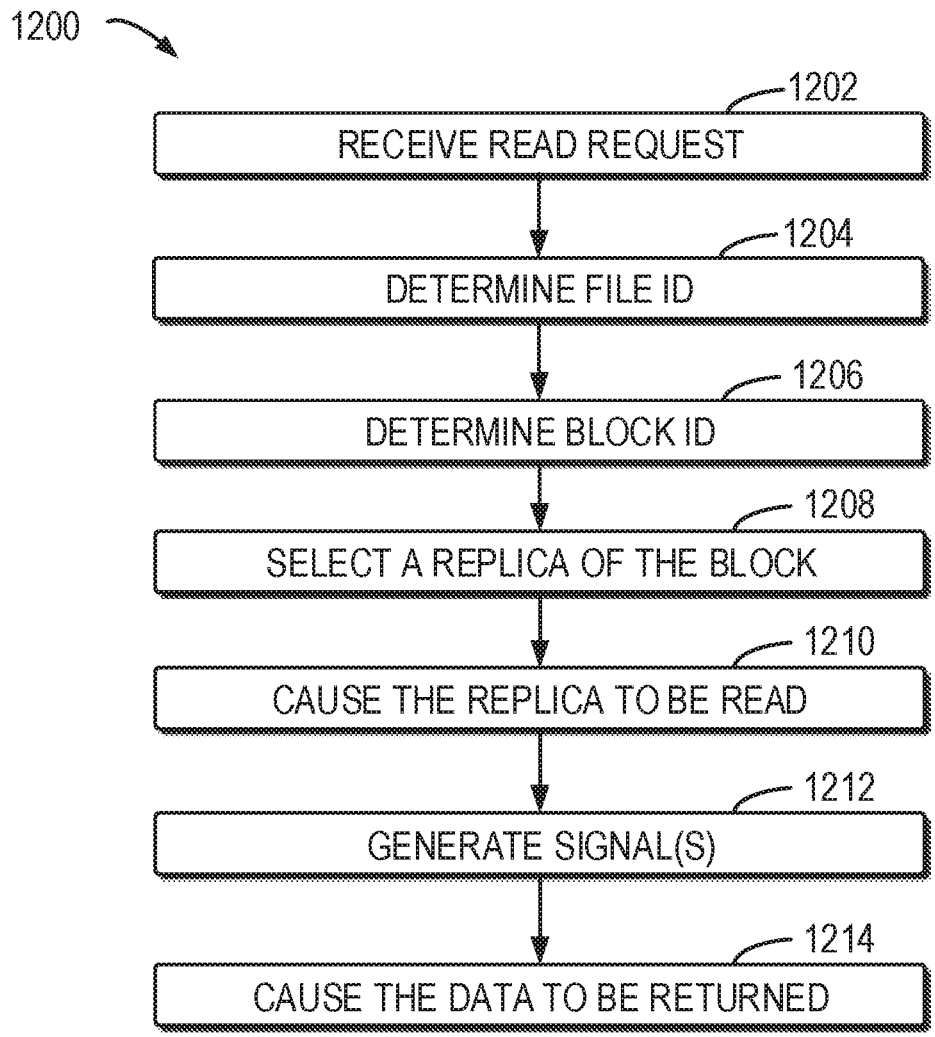
FIG. 12 illustrates a flowchart of a read operation, in accordance with embodiments of the present disclosure.
FIG. 13 illustrates a data format of a signal for updating the statistical metric, in accordance with embodiments of the present disclosure.

In order to explain this process in more detail, reference is now made to FIG. 12, which illustrates a flowchart of an example method 1200 of obtaining the metadata for use in data migration, in accordance with embodiments of the present disclosure. The method 1200 may be regarded as a modified version of the read operation of existing distributed file systems. As described above, the method 1200 may be performed by a file system manager, for example, a daemon executed by a processor. The daemon may also perform the method 600 as described above.

Principles of the present disclosure will now be described with reference to a daemon that implements the method 1200. It is to be understood that the daemon is described only for the purpose of illustration without suggesting any limitations as to the scope of the disclosure.

At operation 1202, the daemon may receive a read request for a file from an application. The distributed file system may be implemented over multiple nodes. The application may be also deployed on the top of one or more nodes.

At operation 1204, the daemon may determine a file identifier (ID) for the file. The file ID may be an inode, path, or the like. At 1206, the daemon may determine a block ID for a block of the file. For example, the daemon may determine the block ID for each block of the file. The file ID and/or block ID may be determined by any method currently known or to be developed in the future.

At operation 1208, the daemon may select a replica of the block. For example, the application may include several tasks distributed over the nodes. For a task processed by a node, the replica located in the node may be selected for the task. If, however, there is no replica in the node, any of the replicas for the block may be selected, for example, in a random way. In some embodiments, the daemon may determine which node having the replica to retrieve the replica. The determination may be made based on the anticipated time to read the replica. For example, network latency and other considerations, such as the racks that the initiator and target nodes are in, may be used to predict which replica would be the quickest to read from.

At operation 1210, the daemon may cause the selected replica to be read by the node. If the selected replica resides on the node, the node will read the replica from local disks. However, if the selected replica resides on a different node, the node will read the replica from the different node. For example, the node denoted as NODE_2 420 may read the selected replica from another node denoted as NODE_1 410. In other words, the selected replica resides on NODE_1 410.

At operation 1212, the daemon may generate one or more signals. For example, each signal may include at least a part of the information listed in the table 1300 shown in FIG. 13. As shown in table 1300, the fields FileID and BlockID denote an identifier of the file and an identifier of the block of the file, respectively. The field ReplicaID denotes an identifier of the replica of the block with BlockID and FileID. The field NodeID denotes an identifier of the node where the replica resides. The field Bytes denotes the size of a block of a read operation. The field ReadTime denotes latency or read time of the read operation on the replica.

In some embodiments, the daemon may generate a signal for each node in the cluster. Then, the signal(s) may be provided to the processor executing method 600 (e.g., using a daemon) to update the metadata, for example, the table 700 shown in FIG. 7.

At operation 1214, the daemon may cause the data, such as the replica, to be returned to the application. For example, the node may return the selected replica to the application. The method 600 and the operation 1214 may be performed in parallel. Alternatively, the block 1214 may be performed before or after the method 600.

After the data is returned at operation 1214, the method 1200 may end.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods, and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining a first set of statistical metrics for a replica of a data block on a first node of a plurality of nodes in a distributed computing environment, the first set of statistical metrics being associated with read operations on the replica, wherein the read operations are initiated by a second node of the plurality of nodes;
   determining whether a first statistical metric in the first set of statistical metrics exceeds a predefined threshold;
   migrating, in response to determining that the first statistical metric exceeds the predefined threshold, the replica from the first node to the second node such that the replica is no longer stored on the first node;

obtaining a second set of statistical metrics for a second replica of a second data block, wherein the second data block and the data block are data blocks of the same file;

combining the second set of statistical metrics with the first set of statistical metrics;

determining whether a combined statistical metric in the combined sets of statistical metrics exceeds the predefined threshold; and migrating, in response to determining that the combined statistical metric exceeds the predefined threshold, the second replica to the second node.

2. The method of claim 1, wherein the first set of statistical metrics is updated in response to a read operation on the replica that is initiated by the second node.

3. The method of claim 1, wherein the first statistical metric is selected from the group consisting of a count for read operations for the replica that are initiated by the second node, an average time for read operations for the replica that are initiated by the second node, and a total time for read operations for the replica that are initiated by the second node; and wherein the predefined threshold is a count threshold when the first statistical metric is the count of read operations, an average time threshold when the first statistical metric is the average time for read operations, and a total time threshold when the first statistical metric is the total time for read operations.

4. The method of claim 1, further comprising:

updating, in response to migrating the replica, metadata associated with the replica to indicate that the replica resides on the second node instead of the first node.

5. The method of claim 1, further comprising:

receiving a read request for a file from an application, wherein the file includes the data block;

selecting the replica of the data block from a plurality of replicas of the data block;

causing the selected replica to be read;

generating, in response to reading the selected replica, a signal; and providing, to a processor, the signal, wherein the signal instructs the processor to update metadata associated with the replica.

6. A system comprising:

a plurality of nodes, the plurality of nodes including a first node and a second node;

a processing unit; and a memory coupled to the processing unit and storing instructions thereon, wherein the instructions, when executed by the processing unit, cause the processing unit to perform a method comprising:

obtaining a first set of statistical metrics for a replica of a data block stored on the first node, the first set of statistical metrics being associated with read operations on the replica, wherein the read operations are initiated by the second node;

determining whether a first statistical metric in the first set of statistical metrics exceeds a predefined threshold;

migrating, in response to determining that the first statistical metric exceeds the predefined threshold, the replica from the first node to the second node such that the replica is no longer stored on the first node;

obtaining a second set of statistical metrics for a second replica of a second data block, wherein the second data block and the data block are data blocks of the same file;

combining the second set of statistical metrics with the first set of statistical metrics;

determining whether a combined statistical metric in the combined sets of statistical metrics exceeds the predefined threshold; and migrating, in response to determining that the combined statistical metric exceeds the predefined threshold, the second replica to the second node.

7. The system of claim 6, wherein the first set of statistical metrics is updated in response to a read operation on the replica that is initiated by the second node.

8. The system of claim 7, wherein the method performed by the processing unit further comprises:

receiving a read request for a file that includes the data block, wherein the read operation is performed in response to receiving the read request.

9. The system of claim 8, wherein the read operation further comprises:

determining a file identifier of the file and a block identifier of the data block; and associating the file identifier and the block identifier with the read operation on the replica that is initiated by the second node.

10. The system of claim 6, wherein the first statistical metric is selected from the group consisting of a count for read operations for the replica that are initiated by the second node, an average time for read operations for the replica that are initiated by the second node, and a total time for read operations for the replica that are initiated by the second node; and wherein the predefined threshold is a count threshold when the first statistical metric is the count of read operations, an average time threshold when the first statistical metric is the average time for read operations, and a total time threshold when the first statistical metric is the total time for read operations.

11. The system of claim 6, wherein the plurality of nodes further includes a third node, wherein the first, second, and third nodes are stored in one or more racks, and wherein the method performed by the processing unit further comprises:

determining that the third node is located in the same rack as the second node; and migrating, in response to determining that the migration of the replica from the first node to the second node failed, the replica from the first node to the third node.

12. A computer program product comprising a computer readable storage medium having program instructions embodied therewith, the program instructions executable by a processor to cause the processor to perform a method comprising:

obtaining a first set of statistical metrics for a replica of a data block on a first node of a plurality of nodes in a distributed computing environment, the first set of statistical metrics being associated with read operations on the replica, wherein the read operations are initiated by a second node of the plurality of nodes;

determining whether a first statistical metric in the first set of statistical metrics exceeds a predefined threshold;

migrating, in response to determining that the first statistical metric exceeds the predefined threshold, the replica from the first node to the second node such that the replica is no longer stored on the first node;

obtaining a second set of statistical metrics for a second replica of a second data block, wherein the second data block and the data block are data blocks of the same file;

combining the second set of statistical metrics with the first set of statistical metrics;

determining whether a combined statistical metric in the combined sets of statistical metrics exceeds the predefined threshold; and migrating, in response to determining that the combined statistical metric exceeds the predefined threshold, the second replica to the second node.

13. The computer program product of claim 12, wherein the first set of statistical metrics is updated in response to a read operation on the replica that is initiated by the second node.

14. The computer program product of claim 13, wherein the read operation is performed in response to receiving a read request for a file that includes the data block.

15. The computer program product of claim 12, wherein the read operation comprises:

determining a file identifier of the file and a block identifier of the data block; and associating the file identifier and the block identifier with the read operation on the replica that is initiated by the second node.

16. The computer program product of claim 13, wherein the first statistical metric is selected from the group consisting of a count for read operations for the replica that are initiated by the second node, an average time for read operations for the replica that are initiated by the second node, and a total time for read operations for the replica that are initiated by the second node; and wherein the predefined threshold is a count threshold when the first statistical metric is the count of read operations, an average time threshold when the first statistical metric is the average time for read operations, and a total time threshold when the first statistical metric is the total time for read operations.

17. The computer program product of claim 12, wherein the first and second nodes are stored in racks, the method performed by the processor further comprising:

determining that a third node is located in the same rack as the second node; and migrating, in response to determining that the migration of the replica from the first node to the second node failed, the replica from the first node to the third node.

* * * * *